United States Patent
Kessler et al.

(10) Patent No.: US 9,252,484 B2
(45) Date of Patent: Feb. 2, 2016

(54) ANTENNA DEVICE AND METHOD OF ANTENNA CONFIGURATION

(71) Applicants: Sebastien Kessler, Dremil-Lafage (FR); Mohamed Cheikh, Toulouse (FR); Alexandru Takacs, Toulouse (FR)

(72) Inventors: Sebastien Kessler, Dremil-Lafage (FR); Mohamed Cheikh, Toulouse (FR); Alexandru Takacs, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 67 days.

(21) Appl. No.: 14/362,409

(22) PCT Filed: Dec. 12, 2012

(86) PCT No.: PCT/EP2012/005134
§ 371 (c)(1),
(2) Date: Jun. 3, 2014

(87) PCT Pub. No.: WO2013/087198
PCT Pub. Date: Jun. 20, 2013

(65) Prior Publication Data
US 2014/0320375 A1 Oct. 30, 2014

(30) Foreign Application Priority Data
Dec. 13, 2011 (FR) .................................. 11 03813

(51) Int. Cl.
*H01Q 1/50* (2006.01)
*H01Q 1/22* (2006.01)
(Continued)

(52) U.S. Cl.
CPC .............. *H01Q 1/50* (2013.01); *G06K 7/10356* (2013.01); *H01Q 1/2216* (2013.01); *H01Q 1/32* (2013.01);
(Continued)

(58) Field of Classification Search
CPC .............. H01Q 7/00; H01Q 1/32; H01Q 1/50
USPC ................... 343/860, 867, 745; 455/571, 550
See application file for complete search history.

(56) References Cited

U.S. PATENT DOCUMENTS

| 6,583,764 B2 * | 6/2003 | Ieda | H01Q 1/3283 343/742 |
| 7,421,321 B2 * | 9/2008 | Breed | B60C 11/24 340/442 |

(Continued)

FOREIGN PATENT DOCUMENTS

| EP | 1 816 705 | 8/2007 |
| EP | 2 031 543 | 3/2009 |

(Continued)

OTHER PUBLICATIONS

International Search Report dated Mar. 8, 2013, corresponding to PCT/EP2012/005134.

*Primary Examiner* — Huedung Mancuso
(74) *Attorney, Agent, or Firm* — Young & Thompson

(57) ABSTRACT

A communication antenna device (D), on board a motor vehicle, for communicating with an antenna of a portable device, includes:
a communication antenna (A) including a first part (A1) having a maximum number of primary windings ($E1_{MAX}$) and a second part (A2) having a maximum number of secondary windings ($E2_{MAX}$),
a microcontroller (10) electrically connected to the antenna (A),
a first switching element (M1), for connecting the first part and/or the second part to the microcontroller (10),
a second switching element (M2), for connecting a determined number of primary windings ($E1_i$) of the first part to the microcontroller (10),
a third switching element (M3), for connecting a determined number of secondary windings ($E2_j$) of the second part to the microcontroller (10), and
elements for controlling (20) the first, second and third switching elements.

10 Claims, 3 Drawing Sheets

Figure 1:
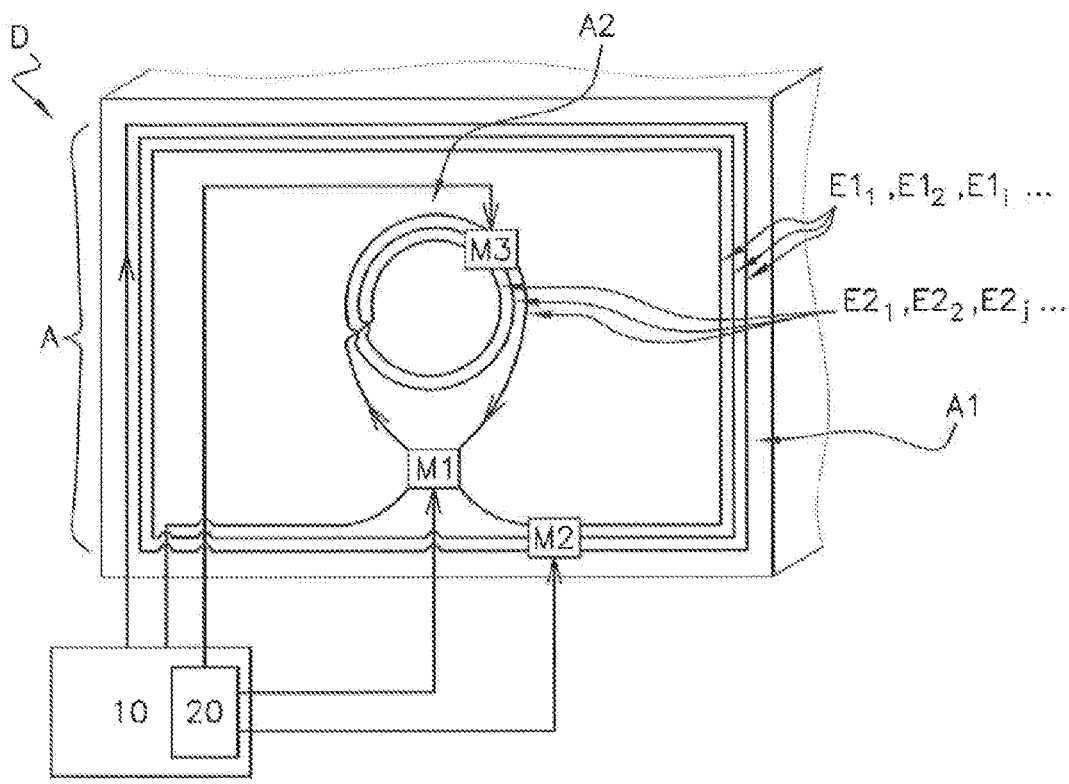

(51) Int. Cl.
*H01Q 1/32* (2006.01)
*H01Q 7/00* (2006.01)
*H01Q 21/28* (2006.01)
*G06K 7/10* (2006.01)

(52) U.S. Cl.
CPC .............. *H01Q 1/3233* (2013.01); *H01Q 7/00* (2013.01); *H01Q 21/28* (2013.01); *G06K 7/10237* (2013.01); *Y10T 29/49016* (2015.01)

(56) References Cited

U.S. PATENT DOCUMENTS

| | | | |
|---|---|---|---|
| 2005/0062667 A1* | 3/2005 | Shirosaka | ................ H01Q 1/38 343/794 |
| 2006/0187051 A1 | 8/2006 | Wu et al. | |
| 2006/0214854 A1* | 9/2006 | Ukai | .................... H04B 1/0466 343/700 MS |
| 2010/0093390 A1* | 4/2010 | Waku | .................... H01Q 1/2208 455/552.1 |
| 2011/0260940 A1 | 10/2011 | Abe et al. | |
| 2013/0093387 A1 | 4/2013 | Vassilieff et al. | |

FOREIGN PATENT DOCUMENTS

| FR | 2981519 | 4/2013 |
|---|---|---|
| JP | 2000 306054 | 11/2000 |
| WO | 2007/030861 | 3/2007 |
| WO | 2009/115115 | 9/2009 |

* cited by examiner

ANTENNA DEVICE AND METHOD OF ANTENNA CONFIGURATION

The invention relates to an antenna device and a method of antenna configuration. More particularly, the invention applies to NFC ('Near Field Communication') type radio frequency (RF) antennas on board a motor vehicle.

NFC antennas on board a motor vehicle have various applications: some NFC antennas are arranged in the doors of the vehicle and form part of the hands-free device for access to the vehicle. They communicate with a portable device, such as a badge, a key or a mobile phone, also equipped with NFC communications means, which is carried by the user of the vehicle. These NFC antennas are used to authenticate the portable device, via an exchange of identifier therewith in order to initiate the unlocking/locking of the vehicle doors.

Other NFC antennas are located in the passenger compartment and are, for example, integrated into a charger of a portable device, e.g. a mobile phone, arranged inside the passenger compartment of the vehicle, for example, located on the dashboard of the vehicle. They are used to exchange information between the mobile phone, which is placed on the charger, and the vehicle's on-board electronics system, connected to the charger. Downloading a user profile or personalizing the dashboard, or presetting radio stations from the mobile phone can thus be performed by the vehicle's on-board system.

NFC antennas are used for short distance communication, of the order of 0 cm, i.e. the portable device is in contact with the receptacle containing the NFC antenna, up to 10 cm. The features of the NFC antenna on board the vehicle, its size, its impedance (i.e. its inductance and its resistance) are determined according to the size of the NFC antenna located in the portable device (badge or mobile phone) with which it communicates and according to the communication distance which separates it from the NFC antenna of the portable device.

Indeed, in order to ensure good quality communication, it is important to calibrate the size of the NFC antenna of the vehicle according to the size of the NFC antenna of the portable device with which it communicates. It is understood that a small NFC antenna in the vehicle emits an intense and localized electromagnetic field. A larger NFC antenna located in a portable device will have difficulties in detecting or receiving this intense and localized field. For the user this means a waiting time until communication is established and/or an extended communication time for data exchange.

A first problem appears when an NFC antenna has to be configured, i.e. its size and impedance have to be chosen, so that it is suitable for communicating with multiple portable devices, the latter having a different size of NFC antenna. This is the case when the NFC antenna has to be able to communicate with a badge, a key and with a mobile phone, carried by the user, for authorizing access to the vehicle. In these cases, it is not possible to ensure the same quality of communication with these different types of portable devices.

Similarly, the impedance of the NFC antenna on board the vehicle is chosen according to a communication distance between this antenna and the NFC antenna of the portable device. If the impedance is too high, then a mismatch occurs with the NFC antenna of the portable device, i.e. the two NFC antennas resonate at the same frequency and communication is disrupted. This phenomenon is known to the person skilled in the art and will not be further detailed here. However, a high impedance is often desired in order to have the largest possible radiation field for the NFC antenna of the vehicle, and thus to be able to communicate as far as possible with a portable device. A problem therefore arises when the portable device is very close to a high impedance NFC antenna. This is the case, for example, when an NFC antenna has its impedance configured, i.e. chosen, for detecting the presence of a portable device at a certain distance from the vehicle and the user presents the portable device at a shorter distance facing the NFC antenna of the vehicle or places the portable device on a charger in which the NFC antenna is located.

Conversely, if the impedance of the NFC antenna is chosen for ensuring good communication at a short distance, i.e. if the impedance value is low, then there is a risk that the NFC antenna may not communicate beyond this distance. This is disadvantageous for users since they must be in the immediate vicinity of the vehicle for identification of the portable device.

In a motor vehicle equipped with a hands-free access device including an NFC antenna and a mobile phone charger including another NFC antenna, there is therefore a cost incentive in being able to design one and the same NFC antenna for these two uses, even if the NFC antenna of the access device is designed for remote communication and that of the mobile phone charger is designed for communicating when the mobile phone is placed on the charger, i.e. in the immediate vicinity of, or even in contact with, the NFC antenna.

The object of the invention is an antenna device enabling the NFC antenna, on board the vehicle, to communicate with a portable device in an optimized way whatever the size of the NFC antenna located in this portable device and whatever the distance separating it from this antenna.

The invention provides a communication antenna device, on board a motor vehicle, for communicating with an antenna of a portable device, said antenna device including:
  a communication antenna including at least two parts, a first part, comprising a maximum number of primary windings and a second part comprising a maximum number of secondary windings,
  a microcontroller electrically connected to said antenna, according to the invention, the antenna device further includes:
  at least one first switching means, located between the microcontroller, the first part and the second part, for connecting the first part and/or the second part, to the microcontroller,
  at least one second switching means, located between the microcontroller, and each primary winding of the first part for connecting a determined number of primary windings of the first part to the microcontroller, and
  at least one third switching means, located between the microcontroller, and each secondary winding of the second part for connecting a determined number of secondary windings of the second part to the microcontroller,
  means of controlling the first, second and third switching means.

Thus according to the invention, the three switching means are used to configure the antenna in size and impedance.

In a preferred mode of embodiment of the invention, the first switching means includes a first set of switches located between the first antenna part and the microcontroller, and a second set of switches located between the second antenna part and the microcontroller, in order to connect the first part and/or the second part respectively to the microcontroller.

More particularly, the two sets of switches are each electrically connected to a matching element in order to match a communication frequency to the first part and the second part.

The matching elements are capacitors for example.

Suitably, the second switching means and the third switching means each comprise a plurality of switches, each switch being located between the microcontroller and a primary winding and a secondary winding respectively in order to connect said primary winding and/or said secondary winding to the microcontroller.

The invention applies to an NFC type near field communication antenna.

The invention also relates to any hands-free device for access to a vehicle, or a device for charging portable equipment including the antenna device according to one of the features listed above.

The invention relates to any motor vehicle including an antenna device according to one of the features listed above.

The invention also provides a method of configuring a communication antenna, using the antenna device described above, including the following steps:

Step 90: determination by the microcontroller of the antenna part or parts to be connected to said microcontroller, Step 100:
connection of the part and/or parts of the antenna determined during the preceding step, to the microcontroller, via the first switching means and control means,
connection to the microcontroller of an initial number of windings of the part and/or parts of the antenna connected during the preceding step, via the second switching means and/or the third switching means and control means, Step 110: communication test between the antenna and an antenna of a portable device, if communication is successful:
Step 300: the antenna is configured,
otherwise if the communication has failed, and
Step 120: if the number of windings is less than the maximum number of windings, then,
Step 130: incrementation of the number of windings connected to the microcontroller via the second and third switching means and control means, and repetition of steps 110 to 130,
otherwise, if the number of windings connected to the microcontroller is equal to the maximum number of primary and/or secondary windings then:
repetition of steps 90 to 130 with the antenna parts which have not been connected to the microcontroller,
if during step 90, all the antenna parts have been connected then,
Step 200: end of the configuration method.

Figure 2:
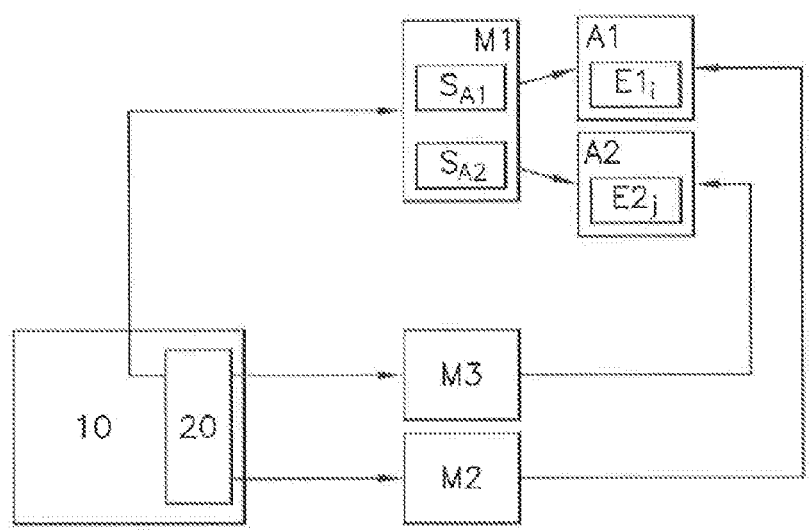
Figure 3:
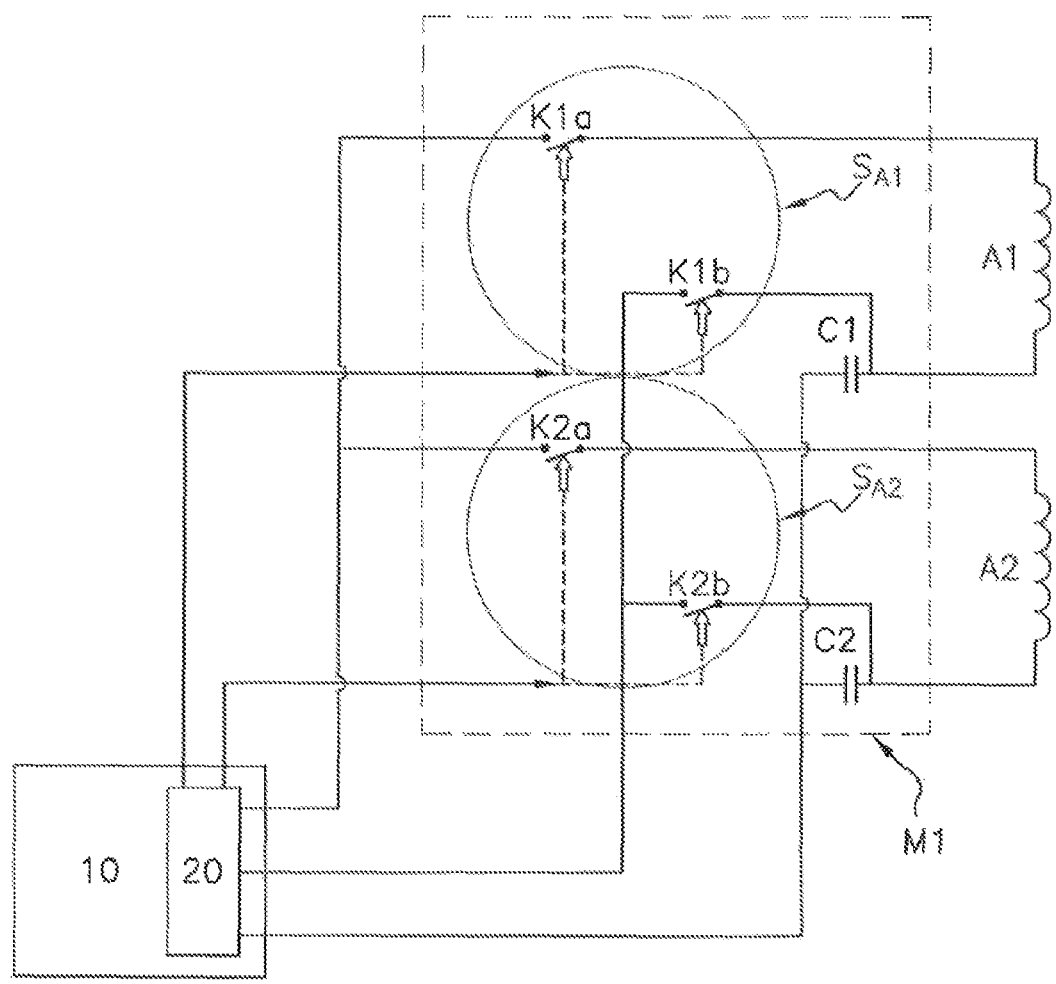
Figure 4:
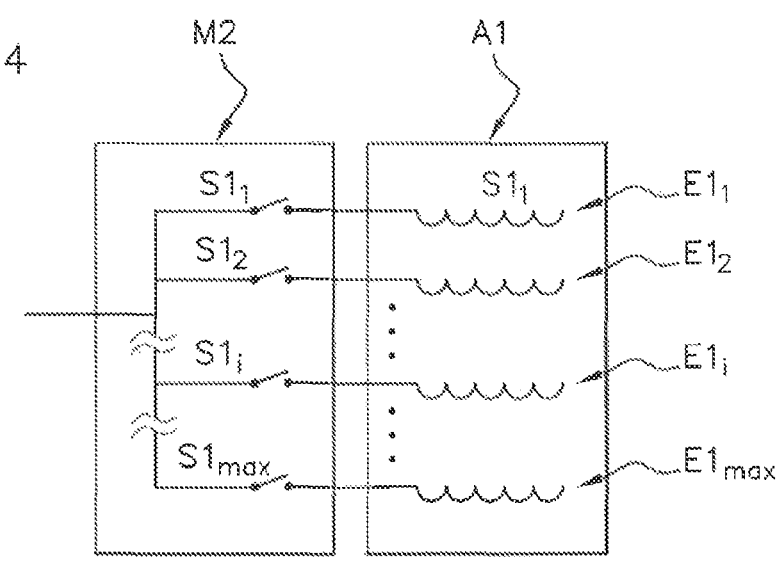
Figure 5:
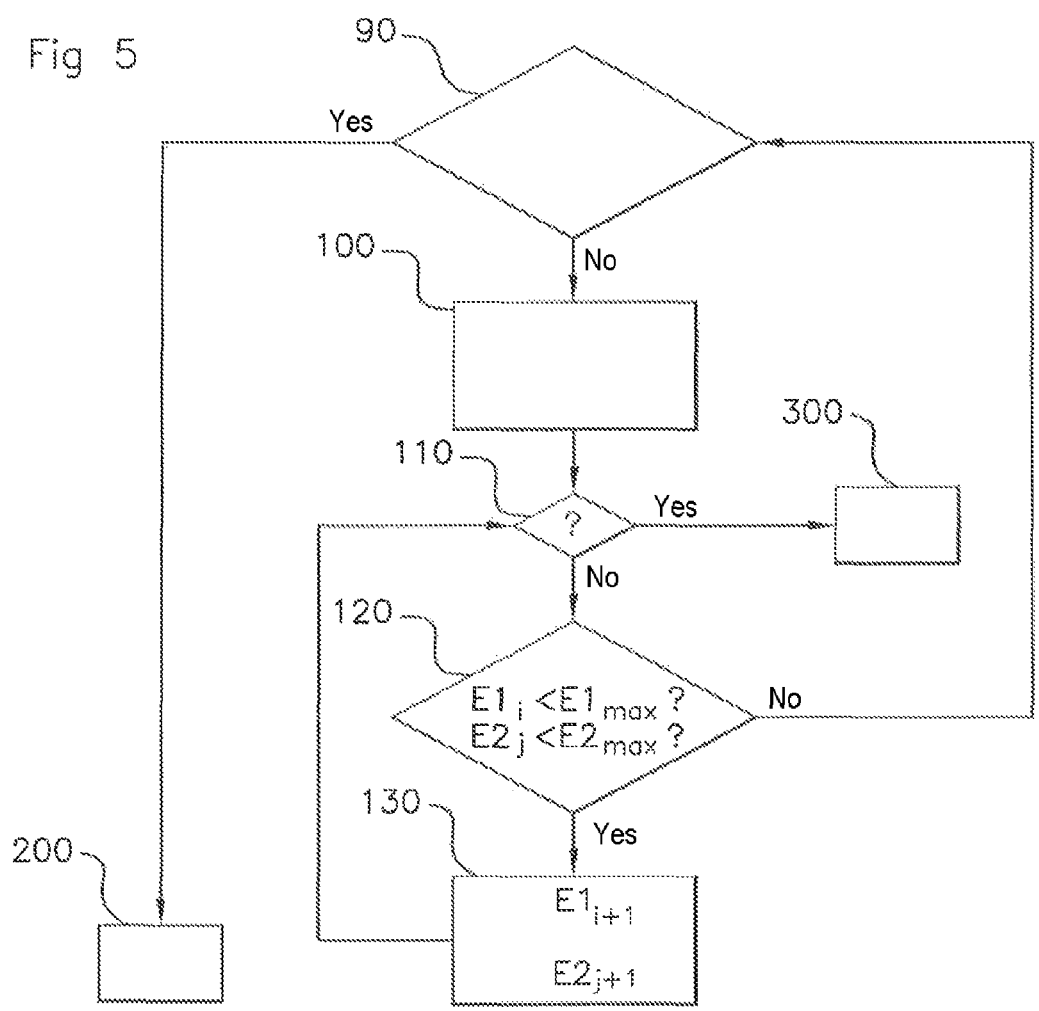

Other objects, features and advantages of the present invention will better emerge from the following description by way of a non-restrictive example of embodiment, with reference to the accompanying schematic drawings in which:

FIG. 1 shows a diagram of the antenna device, according to the invention,

FIG. 2 shows a diagram of the first, second, and third switching means of the antenna device according to the invention, FIG. 3 shows a diagram of a mode of embodiment of a first switching means according to the invention, FIG. 4 shows a diagram of a mode of embodiment of a second or third switching means according to the invention, FIG. 5 shows the flow chart of the antenna configuration method according to the invention.

FIG. 1 shows an antenna device D including an NFC type, near field communication antenna A. The antenna device D further includes a microcontroller 10, electrically connected to said antenna A. This antenna device D can be arranged in a vehicle door and integrated into a hands-free device for access to the vehicle, or it can also be arranged in a device for charging portable equipment, e.g. of the mobile phone type, located in the passenger compartment, on the dashboard of the vehicle, for example.

The antenna A is composed of several parts, in this non-restrictive example, the antenna A including two parts, a first part A1 and a second part A2, of different size, smaller than the first part A1, for example. In FIG. 1, the first part A1 is rectangular in shape, and is located at the inner periphery of the antenna device D. This first part A1 is shown as a rectangular shape, but it may be hexagonal, square, oval, circular, etc. Of course, the shape of the first part A1 depends on the space allocated to the antenna A in the antenna device D. The first part A1 of the antenna A comprises several primary windings $E1_1$, $E1_2$, $E1_i$ . . . of copper wires (or any other conductive material commonly used for antennas) along the inner periphery of the device D.

In FIG. 1, the second part A2 of the antenna A is located in the middle of the antenna device D, it is connected to the first part A1 by a first switching means M1 and is composed of a loop and a plurality of secondary windings $E2_1$, $E2_2$, $E2_i$ . . . of copper wires which are circular in shape and located in the center of the antenna device D. The mode of embodiment and the advantages of this second part A2 have been described in a patent application filed by the applicant (FR 1103107). Similarly, the second part A2 of the antenna A may be rectangular, oval, square or hexagonal.

The illustrations of the first part A1 and the second part A2 given in FIG. 1 are in no way restrictive. The two parts A1, A2 may be located side by side in the antenna device D, and/or may be of a different size and/or pattern.

The antenna A may also comprise more than two parts.

According to the invention, the antenna device includes (see FIGS. 1 and 2):
a first switching means M1 located between the microcontroller 10, the first part A1 and the second part A2 of the antenna A, for connecting the first part A1 and/or the second part A2 of the antenna A to the microcontroller 10,
a second switching means M2, located between the microcontroller 10 and each primary winding $E1_1$, $E1_2$, $E1_i$ . . . of the first part A1 of antenna A, for connecting a determined number of primary windings $E1_i$ of said first part A1 of antenna A to the microcontroller 10,
a third switching means M3, located between the microcontroller 10 and each secondary winding $E2_1$, $E2_2$, $E2_i$ . . . of the second part A2 of antenna A, for connecting a determined number of secondary windings $E2_j$ of said second part A2 of antenna A to the microcontroller 10,
means of controlling 20 the first, second and third switching means.

The first, second and third switching means M1, M2, M3 are controlled by the control means 20, which may be integrated into the microcontroller 10 (see FIGS. 1 and 2). The control means 20 may be in the form of software.

The first switching means M1 comprises two sets of switches $S_{A1}$ and $S_{A2}$ (see FIG. 3).

The first set of switches $S_{A1}$ is located between the microcontroller 10 and the first antenna part A1. It includes a first switch K1a and a second switch K1b, located between the microcontroller 10 and the two terminals of the antenna A1 and a matching element, e.g. a capacitor C1 connected to the second switch K1b and to the antenna A1. The first and second switches K1a and K1b are electrically connected. The matching element C1 is used to match the operating frequency of the antenna according to its size. Indeed, according to the size of the chosen antenna (A1, A2 or A1 and A2), the communication frequency changes, which frequency must therefore be matched and the appropriate capacitor chosen, according to the chosen antenna part. By closing the first set of switches $S_{A1}$, i.e. by closing the first and second switches K1a and K1b simultaneously, the first antenna part A1 is connected to the microcontroller 10, i.e. powered up with the capacitance C1 (closure of the second switch K1b) and it can then receive information from the microcontroller 10 (closure of the first switch K1a). This information is, for example, data to be exchanged with the NFC antenna located in the portable device.

By closing the first set of switches $S_{A1}$, the first antenna part A1 is connected to the microcontroller 10 and is functional, and is thus activated. It can send data to the NFC antenna (not shown) located in a portable device.

Similarly, the second set of switches $S_{A2}$ is located between the microcontroller 10 and the second antenna part A2. It includes a third switch K2a and a fourth switch K2b, and a matching element, i.e. a capacitance C2, for example. The third and fourth switches K2a and K2b are electrically connected. By closing the second set of switches $S_{A2}$, the second antenna part A2 is connected to the microcontroller 10 with the capacitance C2 (closure of the fourth switch K2b) and it receives information from the microcontroller 10 (closure of the third switch K2a).

By closing the second set of switches $S_{A2}$, the second antenna part A2 is then powered up and functional, and is thus activated. It can send data to the NFC antenna located in a portable device.

The control means 20 of the switching means which are included in the microcontroller 10 can thus close the two sets of switches $S_{S1}$ and $S_{A2}$, separately or simultaneously, and thus configure the size of the antenna A which is active, which then consists of either the first A1 or the second part A2, or the combination of the first and second part A1, A2 connected together.

The first switching means M1 can therefore be used to determine the size of the antenna A. By closing/opening the two sets of switches $S_{A1}$ and $S_{A2}$ which constitute this first switching means M1, the control means 20 thus adjust the size of the antenna A by connecting the first part A1, or the second part A2 of the antenna or both parts joined to the microcontroller 10. The part thus connected can exchange information with an NFC antenna of the portable device (not shown in FIG. 1).

Once the size of the antenna A is determined, thanks to the first switching means M1, the second and third switching means M2, M3 are used to adjust the impedance of the antenna A, by connecting a determined number of windings $E1_i$, $E2_j$ to the microcontroller 10. Indeed, the antenna impedance is a function, inter alia, of the number of windings of copper wires of this antenna.

Thus, if the first part A1 of the antenna A is connected to the microcontroller 10, the second switching means M2 (see FIG. 4) is used to adjust its impedance by connecting a determined number of primary windings $E1_i$ of this first part A1 to the microcontroller 10.

For this, the second switching means M2 comprises a plurality of switches $S1_1, S1_2, \ldots S1_i \ldots S1_{MAX}$, each located between the microcontroller 10 (more precisely between the control means 20) and a primary winding $E1_1, E1_2, \ldots E1_i \ldots E1_{MAX}$, i.e. connected to a copper wire of the first part A1 of antenna A. The control means 20 control the opening and closure of each switch $S1_1, S1_2, \ldots S1_i \ldots S1_{MAX}$, of the second switching means M2, and thus connect a determined number of primary windings to the microcontroller 10, for the purpose of obtaining a desired impedance of said first antenna part A1.

Similarly, the third switching means M3 (not shown) adjusts the impedance of the second part A2 of antenna A and, for this, comprises a plurality of switches $S2_1, S2_2, \ldots S2_i \ldots S2_{MAX}$ each located between the microcontroller 10 (more precisely between the control means 20) and a secondary winding $E2_1, E2_2, \ldots E2_i \ldots E2_{MAX}$ of the second part A2. The control means 20 control the opening and closure of each switch $S2_1, S2_2, \ldots S2_i \ldots S2_{MAX}$, of the third switching means M3, in order to connect a determined number of secondary windings $E2_1, E2_2, \ldots E2_i \ldots E2_{MAX}$, to the microcontroller 10, for the purpose of obtaining a desired impedance of said second antenna part A2.

Thus, if the second part A2 of the antenna A is connected to the microcontroller 10, the third switching means M3 is used to adjust its impedance by connecting a number of secondary windings $E2_j$ to the microcontroller 10.

The numbers of primary and secondary windings $E1_i$ and $E2_j$ which are thus selected vary from one winding to a maximum number of primary and secondary windings (respectively $E1_{MAX}$ and $E2_{MAX}$) of copper wires physically present on each of the parts A1, A2 of the antenna A.

The first, second and third switching means M1, M2, M3 are controlled by the control means 20 located in the microcontroller 10, according to a method of antenna configuration described farther on.

The microcontroller 10 manages communication between the antenna A and the NFC antenna of the vehicle and the NFC antenna of the portable device (not shown) with which it communicates.

The representations of switching means M1, M2, M3 and switches K1a, K1b, K2a, K2b, $S1_1, S1_2, \ldots S1_i \ldots S1_{MAX}$, $S2_1, S2_2, \ldots S2_i \ldots S2_{MAX}$ are given non-restrictively, and these switches may be implemented by any equivalent switching means known to the person skilled in the art.

The method of antenna configuration according to the invention is illustrated in FIG. 5.

During a first step 90, the microcontroller 10 determines which is or which are the antenna part(s) to be connected to the microcontroller 10. This step can be achieved by software.

During step 100, the configuration of the antenna A is initialized. By default, in our example, the method is initialized by connecting the first antenna part A1 to the microcontroller 10 via the first switching means M1. This is performed by the control means 20 which close the first set of switches $S_{A1}$. Then, the control means 20 connect to the microcontroller 10, via the second switching means M2 (by closing the appropriate number of switches $S1_1, S1_2, \ldots S1_i \ldots S1_{MAX}$), an initializing number of primary windings $E1_i$, less than the maximum number $E1_{MAX}$ of primary windings of said first part A1. During the initialization of the configuration, it is wise to first choose the largest antenna part (A1) in order to obtain a wider radiation and to detect any NFC antenna located around the vehicle.

During step 110, the antenna A thus initially configured in size and impedance receives a message from the microcontroller 10 which sends it to the antenna of the portable device. If communication is successful, i.e. if the antenna A of the vehicle receives a return message from the antenna of the portable device, (step 110), then the method stops (step 300) and the antenna A is configured, i.e. its size and its impedance have been chosen for enabling communication with the NFC antenna of the portable device.

If there is no communication between the two antennas or if this communication fails (step 110) and if the number of primary windings $E1_i$ is less than the maximum number $E1_{MAX}$ of primary windings of the first part A1 (step 120), then the method provides that during step 130, the number of primary windings $E1_i$ connected to the microcontroller 10 is incremented, e.g. by adding a primary winding i.e. by closing an additional switch $S1_1, S1_2, \ldots S1_i \ldots S1_{MAX}$ via the second switching means M2. Then, the method returns to step 110 and a test communication is performed between the antenna A thus configured (i.e. A1) with an additional primary winding $E1_{i+1}$ and the antenna of the portable device. The method thus repeats steps 110 to 130 until communication has been established and the number of primary windings $E1_i$ of the first antenna part A1 which are connected to the microcontroller 10 (by the closure of the associated switches) is less than the maximum number of primary windings $E1_{MAX}$.

If communication is successful at step 110 with a certain number of primary windings (e.g. $E1_{i+1}$) connected to the microcontroller 10, then the method stops (step 300) and the configuration of antenna A is complete.

However, when at step 120, the maximum number of primary windings $E1_{MAX}$ of the first antenna part A1 has been reached, and communication has still not been able to be established in the preceding step 110, then the method returns to step 90, and the microcontroller 109 determines which is or are the antenna part(s) that have not yet been connected to the microcontroller 10. In our example, this is the second antenna part A2.

During step 100, the control means 20, with the aid of the first switching means M1, configure the antenna A with the antenna part(s) which have/has not yet been connected, here, in this example, the second part A2 of antenna A is then connected to the microcontroller 10. For this, the control means 20 first open the first set of switches $S_{A1}$, in order to disconnect the first antenna part A1 from the microcontroller 10, then close the second set of switches $S_{A2}$ in order to connect the second antenna part A2 to the microcontroller 10. Then, with the aid of the third switching means M3, the control means 20 connect to the microcontroller 10 an initial number of secondary windings $E2_j$ of this second antenna part A2 by closing an appropriate number of switches $S2_1$, $S2_2, \ldots S2_i \ldots S2_{MAX}$.

Steps 110 to 130 are then repeated with the second antenna part A2, and the number of secondary windings $E2_j$.

If communication (step 110) is successful with a number of secondary windings $E2_k$, then the method stops and the configuration of antenna A is complete (step 300). The size of the antenna and its impedance being thus configured, the antenna is ready for effectively communicating with a determined portable device.

Otherwise, as long as communication fails (step 110), and the number of secondary windings $E2_j$ is less than the maximum number of secondary windings $E2_{MAX}$ (step 120) of the second antenna part A2, then the control means 20 increment the number of secondary windings connected to the microcontroller 10 during step 130, by closing one by one more switches $S2_1, S2_2, \ldots S2_i \ldots S2_{MAX}$ and the method returns to step 110 in order to attempt to communicate with the antenna of the portable device.

If communication cannot be achieved once the maximum number of secondary windings $E2_{MAX}$ of the second antenna part A2 is reached, then the method returns to step 90. If the first A1 and the second part A2 of antenna A have not been simultaneously connected to the microcontroller 10 (step 90), the control means 20 then connect, with the aid of the first switching means M1, both antenna parts A1, A2 simultaneously (steps 100) to said microcontroller 10, by closing both sets of switches $S_{A1}$ and $S_{A2}$. Then the control means 20 connect to the microcontroller 10 for each of these parts, with the aid of the second and third switching means M2 and M3, initial numbers of windings $E1_i, E2_j$. Steps 110 to 130 are then repeated, simultaneously, for both parts A1 and A2, until communication is established with the antenna of the portable device and as long as the number of primary and secondary windings ($E1_i, E2_j$) are less than the maximum number of respective primary and secondary windings ($E1_{MAX}, E2_{MAX}$) of each part (A1, A2).

Indeed, the technical features of the configuration of antenna A consisting of the two parts A1 and A2 connected to one another, are different from the two parts A1, A2 taken separately. This third configuration (A1 and A2) possesses different qualities of radiated field, in this case the field emitted is more uniform than that emitted by the antenna parts (A1, A2) taken separately and can be used to establish communication with a portable device that the two parts A1 and A2 activated separately cannot achieve.

If, at step 120, the maximum number of primary and secondary windings ($E1_{MAX}, E2_{MAX}$) is reached for each antenna part (A1 and A2), then the method returns to step 90.

If, at step 90, it proves that all the configurations, i.e. in our example, the three configurations, A1 or A2 taken separately or simultaneously have been connected to the microcontroller 10, each with a maximum number of primary and/or secondary windings ($E1_{MAX}, E2_{MAX}$) then the method stops (step 200), and the antenna A cannot be configured, i.e. it is not possible to find a size and an impedance enabling it to communicate with the NFC antenna of the portable device.

The configuration method according to the invention therefore consists:
in initially choosing a size and an impedance of the communication antenna A,
in making a test communication between the communication antenna thus configured and an NFC antenna of a portable device,
in modifying the size and impedance of said communication antenna until communication is established.

It should be noted that the method of antenna configuration is very fast, and only lasts a few milliseconds, even if the three antenna configurations, first part A1, second part A2, and first A1 and second A2 parts simultaneously, are tested successively and each with winding increments. Indeed, for verifying communication at step 110, it is sufficient for the antenna A to send a radio frequency signal of one millisecond and wait for a response within the next few milliseconds. This type of RF transmission is known to the person skilled in the art and is termed a "ping."

Of course, the invention is neither limited to two antenna parts A1, A2, nor to three switching means M1, M2, M3. The antenna device D may include an antenna consisting of a plurality of parts A1 ... Ai, all connected with one another via a plurality of first switching means M1 ... Mi, each part having its own switching means dedicated to connecting the number of windings for this part to the microcontroller 10.

The invention can therefore be used to configure an NFC type communication antenna so that it can communicate quickly and effectively with a portable device whatever the distance separating it from this device (within the limits of an NFC communication of course) and whatever the size of the communication antenna located in this device.

In addition, the antenna device according to the invention is inexpensive, and consists of a circuit including switches and switching means, and software integrated into a microcontroller (means of controlling 20 the switch means).

The invention can also be used to configure one and the same NFC antenna on a vehicle for different applications and therefore enables the use of a generic antenna on the vehicle capable of communicating with different mobile phones equipped with communication means including commercially available NFC antennas of any dimensions and any features (impedance), which can also be used to reduce the development and manufacturing costs of this antenna.

The invention is not limited to NFC antennas and applies to any radio frequency antenna.

The invention claimed is:

1. A communication antenna device (D), on board a motor vehicle, for communicating with an antenna of a portable device, said antenna device (D) including:
   a communication antenna (A) including at least two parts, a first part (A1), comprising a maximum number of primary windings ($E1_{MAX}$) and a second part (A2) comprising a maximum number of secondary windings ($E2_{MAX}$),
   a microcontroller (10) electrically connected to said antenna (A),
said antenna device (D) being characterized in that it further includes:
   at least one first switching means (M1), located between the microcontroller (10), the first part (A1) and the second part (A2), for connecting the first part (A1) and/or the second part (A2) to the microcontroller (10),
   at least one second switching means (M2), located between the microcontroller (10), and each primary winding ($E1_i$) of the first part (A1) for connecting a determined number of primary windings ($E1_i$) of the first part (A1) to the microcontroller (10), and
   at least one third switching means (M3), located between the microcontroller (10), and each secondary winding ($E2_j$) of the second part (A2) for connecting a determined number of secondary windings ($E2_j$) of the second part (A2) to the microcontroller (10),
   means of controlling (20) the first, second and third switching means (M1, M2, M3).

2. The antenna device (D) according to claim 1, characterized in that the first switching means (M1) includes a first set of switches ($S_{A1}$) located between the first antenna part (A1) and the microcontroller (10), and a second set of switches ($S_{A2}$) located between the second antenna part (A2) and the microcontroller (10), in order to connect the first part (A1) and/or the second part (A2) respectively to the microcontroller (10).

3. The antenna device (D) according to claim 2, characterized in that the two sets of switches ($S_{A1}$, $S_{A2}$) are each electrically connected to a matching element in order to match a communication frequency to the first part (A1) and the second part (A2).

4. The antenna device (D) according to claim 3, characterized in that the matching elements are capacitors (C1, C2).

5. The antenna device (D) according to claim 1, characterized in that the second switching means (M2) and the third switching means (M3) each comprise a plurality of switches ($S1_1$, $S1_2$, ... $S1_i$, ... $S1_{MAX}$, $S2_1$, $S2_2$, ... $S2_i$, ... $S2_{MAX}$), each switch being located between the microcontroller (10) and a primary winding and a secondary winding respectively ($E1_1$, $E1_2$, ... $E1_i$, ... $E1_{MAX}$, $E2_1$, $E2_2$, ... $E1_i$, ... $E2_{MAX}$) in order to connect said primary winding and/or said secondary winding ($E1_1$, $E1_2$, ... $E1_i$, ... $E1_{MAX}$, $E2_1$, $E2_2$, ... $E2_i$, ... $E2_{MAX}$) to the microcontroller (10).

6. The antenna device (D) according to claim 1, characterized in that the antenna (A) is an NFC type near field communication antenna.

7. A hands-free device for access to a vehicle, characterized in that it includes the antenna device (D) according to claim 1.

8. A device for charging portable equipment, characterized in that it includes the antenna device (D) according to claim 1.

9. A method of configuring a communication antenna (A), using the antenna device (D) according to claim 1, characterized in that it includes the following steps:
   Step 90: determination by the microcontroller (10) of the antenna part or parts (A1, A2) to be connected to said microcontroller (10),
   Step 100:
      connection of the part and/or parts (A1, A2) of the antenna (A) determined during the preceding step, to the microcontroller (10), via the first switching means (M1) and control means (20),
      connection to the microcontroller (10) of an initial number of windings ($E1_i$, $E2_j$) of the part and/or parts (A1, A2) of the antenna (A) connected during the preceding step, via the second switching means (M2) and/or the third switching means (M3) and control means (20),
   Step 110: communication test between the antenna (A) and an antenna of a portable device, if communication is successful:
      Step 300: the antenna is configured,
      otherwise if the communication has failed, and
      Step 120: if the number of windings ($E1_i$, $E2_j$) is less than the maximum number of windings ($E1_{MAX}$, $E2_{MAX}$), then,
         Step 130: incrementation of the number of windings ($E1_{i+1}$, $E2_{j+1}$) connected to the microcontroller (10) via the second and third switching means (M2, M3) and control means (20), and repetition of steps 110 to 130,
      otherwise, if the number of windings ($E1_{i+1}$, $E2_{j+1}$) connected to the microcontroller (10) is equal to the maximum number of primary and/or secondary windings ($E1_{MAX}$, $E2_{MAX}$), then:
         repetition of steps 90 to 130 with the antenna parts (A1, A2) which have not been connected to the microcontroller (10),
         if during step 90 all the antenna parts have been connected then,
   Step 200: end of the configuration method.

10. A motor vehicle including an antenna device (D) according to claim 1.

* * * * *